Aug. 18, 1953     L. K. DAVIS     2,648,895
PRESTRESSING STRUCTURAL MEMBERS
Filed March 19, 1946
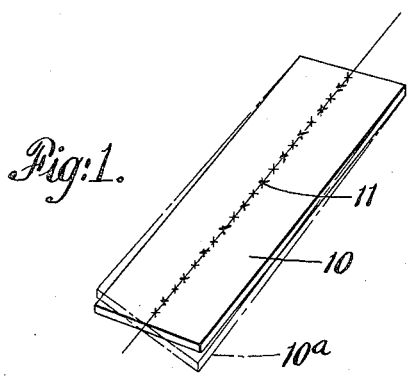
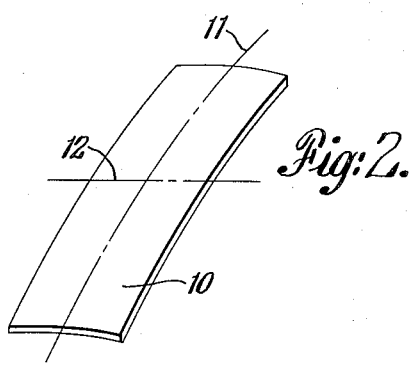
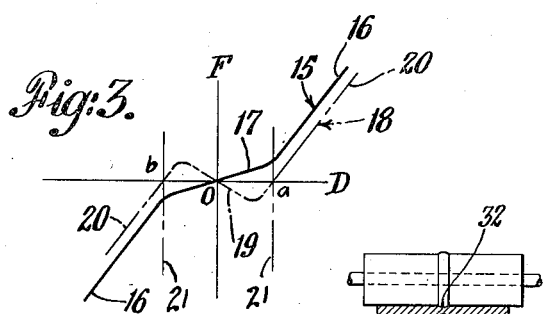
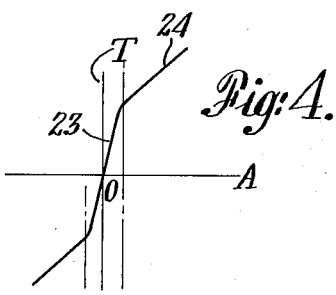
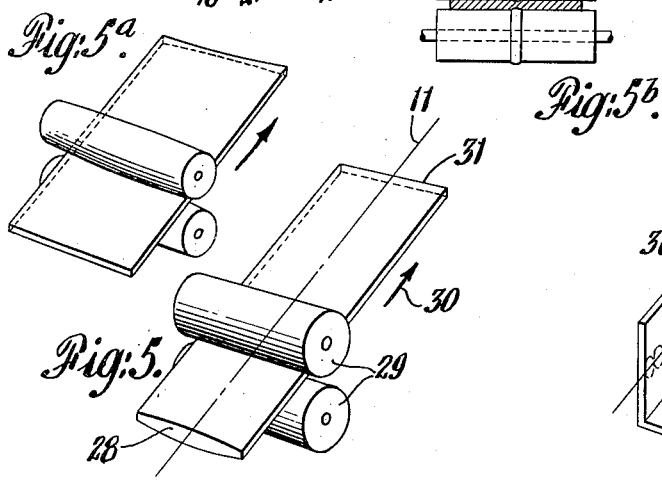
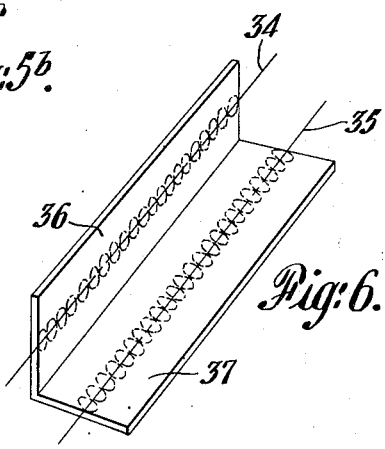
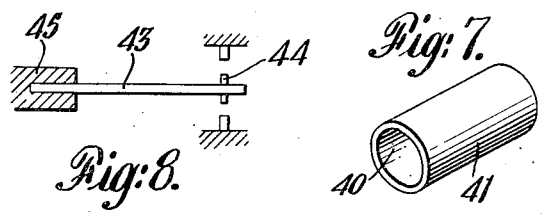
INVENTOR
LINCOLN K. DAVIS
BY
Austin, Wilhelm + Carlson
ATTORNEYS Patented Aug. 18, 1953

2,648,895

UNITED STATES PATENT OFFICE 2,648,895

PRESTRESSING STRUCTURAL MEMBERS

Lincoln K. Davis, Brockton, Mass.

Application March 19, 1946, Serial No. 655,553

1 Claim. (Cl. 29—155)

The invention relates to improving the properties of structural members and more particularly to pre-stressing or pre-loading them in such manner as to improve certain desired characteristics. For example, the member may be pre-stressed to make it more rigid in torsion. As a further example, a member may be stressed to increase its flexibility, that is, to make it less rigid in bending.

The shape of many structures renders it difficult to reinforce them against warping forces so that the torsional stiffness of the individual structural elements determines the degree of distortion that takes place. Examples are the frame of a box, a slender arm, an automobile frame, etc. which are commonly built up of strips, bars, angles, channels, tubes, etc. having adequate resistance to bending but often lacking in sufficient torsional rigidity. According to the present invention, the individual members of such a structure may be pre-stressed to increase the torsional stiffness of the several members, and thus the resistance against warping of the structure as a whole, all without change in dimensions, shape or weight.

In certain structures and mechanisms it is often necessary or desirable to use flexible unitary members to obtain freedom of motion or some predetermined force-displacement characteristic along a certain path, combined with maximum resistance to motion in other directions. For example, a stylus, valve, armature, electrical contact, etc. is commonly supported by a leaf spring which exercises the necessary restraints but often is not ideally flexible in the direction of intended motion. According to the invention, such a member may be pre-stressed to reduce stiffness and if desired, to produce an absolutely limp condition of the leaf spring. As a further example, it is desirable for a multiple leaf type automobile spring to give soft action through its central range of movement and stiffer action towards the ends of its movement in both directions. This may be readily accomplished according to the teachings of the invention.

The invention also consists in certain new and original features and combinations hereinafter set forth and claimed.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part hereof, in which:

Fig. 1 illustrates a metal strip pre-stressed according to the invention;

Fig. 2 illustrates somewhat diagrammatically one form which the pre-stressed strip of Fig. 1 may take;

Figs. 3 and 4 are curves to assist in explaining the action of pre-stressing according to the invention;

Fig. 5 illustrates a method of pre-stressing using rolls; Figs. 5(a) and 5(b) illustrate modified forms using rolls;

Fig. 6 illustrates a well known structural shape pre-stressed according to the invention;

Fig. 7 illustrates a tube pre-stressed according to the invention;

Fig. 8 illustrates a flexible leaf spring pre-stressed according to the invention; and Fig. 9 illustrates diagrammatically an automobile spring whose leaves are pre-stressed according to the invention.

In the following description and in the claim, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to Figs. 1 and 2, these figures illustrate a flat strip of metal pre-stressed according to the invention. The member in the form shown comprises a single uniform thickness of homogeneous metal. It may also comprise a strip of bimetal comprising two or more layers of metal having different temperature coefficients welded together throughout their entire area.

The strip 10 is peened as indicated along the central longitudinal axis 11 but not along the longitudinal side margins. This peening places the central portion of the strip in compression which tends to lengthen it, placing the side margins in tension. Such a strip, when bent longitudinally, will arch somewhat transversely, as shown to an exaggerated degree in Fig. 2, since the compressed center section tries to relax by taking a larger radius than the side margins, and in so doing, it causes arching and aids bending in either direction. Such a strip exhibits decreased bending resistance, that is to say, it bends more easily about a transverse axis 12 than the original unstressed strip. But such strip also exhibits increased torsional resistance against twisting about longitudinal or neutral axis 11 as indicated by position 10a in Fig. 1, because the pre-loading of the side margins, placing them in tension, resists the lengthening of them produced by twisting.

The behavior of such a pre-stressed strip is illustrated by the curves shown in Figs. 3 and 4. Referring first to Fig. 3, bending force F is plotted as a function of the resultant displacement or strain D, the origin being indicated by O. The solid line curve 15 has straight ends 16 in accordance with Hooke's law but the intermediate portion 17 (between lines 21) has less slope showing that less force is required for a given displacement in this region. Thus, in this region the compressed center portion of the strip 10 aids bending, providing lessened effective bending modulus.

Peening of the center of the strip 10 may be carried sufficiently far to cause snap action about transverse axis 12. Such snap action condition is indicated by the dot-and-dash line curve 18. Here the strip 10 is in unstable equilibrium or on dead center when flat, as indicated by curve 18 passing through the origin O; unstable throughout the intermediate portion 19 (between lines 21) of the curve; and stable in two positions a and b on the opposite sides of the origin, having normal spring action at greater displacement, as indicated by the straight ends 20 of the curve. Snap action occurs when over-centering action predominates. By over-centering action is meant an action in which the displacing force of the spring acts away from central position when the spring is displaced from central position, in contrast to an action in which the force exerted by the spring acts toward central position when the spring is displaced from central position. This last action is normal spring action. In general, stressing to the point of snap action is not desirable. But in the event strip 10 is a part of a structure that supports it in such a manner that snap action cannot occur, then stressing may be carried to a point limited only by the properties of the material used.

In case, for example, of an angle iron (Fig. 6) or channel iron, a condition corresponding to snap action in either or both webs may be reached without overall instability because the angularly related webs support each other and prevent bending.

It is obvious that the metal may be stressed to a condition midway between the two curves 15 and 18 so that the intermediate region M is horizontal, in which case the metal strip 10 will be limp, requiring substantially no force in bending in either direction through the region in which the curve is truly horizontal.

Referring to Fig. 4 angular force or torsional force T is shown plotted as a function of angular deflection A, the origin being indicated by O. The curve shown herein has an intermediate portion 23, passing through the origin O, of relatively high slope where a relatively high angular force is required to obtain a relatively small angular displacement. Beyond the central region the curve has a less steep slope as at 24, indicating a displacement corresponding to the normal characteristics of the material. The greater slope of the intermediate part of the curve lies in the region in which the compressed center section and stretched margins of the strip resist torsion, providing increased effective torsional modulus.

Referring now to Fig. 5, another method is shown for pre-stressing a metal strip to place the metal along the longitudinal center line 11 in compression and that along the side longitudinal margins in tension. This strip may be originally fabricated with a curved or arched cross section thicker in the center than at the edges, as indicated at 28. The strip may be arched on one side only and plane on the other. Such a strip is then passed between cylindrical rolls 29 in the direction of the arrow 30 which rolls flatten the strip into a rectangular cross section indicated by 31. This rolling operation on this particular shape compresses the metal along the center line 11 and tensions the longitudinal side margins.

The strip need not be rolled to final flatness. It may be flat initially and then rolled to some non-rectilinear cross section as illustrated in Figs. 5(a) and 5(b). Or, the cross section may be of any regular or irregular shape and then rolled to some other shape, provided the principle of compressing the metal along the center line or neutral axis is followed. The upper and lower rolls may not be necessarily the same. One may be crowned and the other cylindrical. In Fig. 5(a) both upper and lower rolls are crowned and flat stock of rectangular cross section is rolled into stock which is thinner along the longitudinal center line than at the longitudinal edges.

If desired, a beaded roll, such as shown in Fig. 5(b), may be used. Here flat stock of rectangular cross section is passed between the beaded rolls which roll a visible groove 32 along the central longitudinal axis. Such a groove may be either on top or bottom surfaces, or on both surfaces, depending upon the shape of the rolls. The presence of the grooves formed by the beaded rolls has the further advantage of assisting in identifying pre-stressed stock at a glance. The peening marks in Fig. 1, and whenever peening is used, can also be made intentionally visible for identification.

Instead of only one bead on a roll, two or more beads close together on the same roll may be used. Or, if the strip is very wide, the beads may be separated so that there are actually two longitudinal axes of compression disposed nearer the longitudinal edges, leaving the central longitudinal axis tensioned but inactive. A tensioned central longitudinal axis is permissible because it is neutral and placing the strip in torsion does not change its length. This form has the disadvantage, however, in that it may overload the axes of compression.

It will be understood that to improve bending characteristics of the strip shown in Fig. 1, that is to obtain minimum bending rigidity, the outer longitudinal margins or intermediate longitudinal axes between the center axis 11 and the margins of the unstressed strip may be peened so as to place them under compression, thus placing the metal along the center line 11 under tension. Such treatment, however, may or may not increase torsional rigidity depending upon the position of such axes. In fact, the member may be so stressed as to lessen its torsional rigidity and even make it snap in torsion.

Referring now to Fig. 6, the principles of the invention are shown applied to a short length of structural angle form. As is well known, a structural angle member comprises in effect two flat side, web, or plate members bent or otherwise secured at their edges to form the corner of the angle. These members are commonly made in rolling mills as in steel mills by being rolled into shape. However, they may be fabricated from flat sheet material and bent to shape. In either case, they should be treated to remove internal stress before treatment according to the invention.

In Fig. 6, the center lines 34, 35 of the webs 36, 37 are peened as indicated. This peening puts the center lines in compression and the longitudinal marginal edges of the webs in tension. Such pre-stressing may result, for either web 36 or 37, in any of the performance curves illustrated in Fig. 3 even to the point of obtaining snap action which of course is prevented because the webs support each other and prevent bending. Since this prestressing increases the resistance to torsion of each web, the pre-stressing increases the resistance to torsion of the entire shape. Resistance to bending is already high due to the angular relationship of the webs. It is not necessary to treat more than one web to obtain increased torsional resistance, and rolling may be substituted for peening.

It will be understood that the principles described in connection with Fig. 6 may be applied to other structural shapes such as T-members, channel members, Z-members, I-beams, etc. In each case the several webs may be peened as described above.

Referring now to Fig. 7, the pre-stressing according to the invention is applied to a hollow tube which may be used as an axle, rotary transmission shaft, structural member, etc. This tube is first treated to free it of stress and is then stressed according to the invention. The tube may be peened internally to place the inner surface 40 in compression which stretches it and then places the outer surface 41 in tension. Or, the inner surface may be compressed by forcing a mandrel through the tube. Or, the tube may be quenched internally from a softening heat. When the entire tube is heated to the softening point and quenched inside, the contraction will shorten the tube while the outside is still soft. Slow cooling will then put the outside surface in tension. Such a tube will then be more resistant in torsion than a similar untreated tube, for the reason that twisting about a longitudinal axis causes a stretching of the outside surface relative to the inside. Hence the tension already present will produce greater resistance to such relative stretching than if the outside surface were in a relaxed state.

In any of the strips described above the prestressing may be obtained by heating the entire strip to softening temperature and then selectively quenching along the longitudinal center line. This shortens the entire strip while the longitudinal margins are still soft. Further cooling then puts these margins in tension. The same treatment may be applied along any axis to be placed in compression.

Referring now to Fig. 8, the leaf spring is shown for use in a valve, armature, electric contact, etc. For purposes of illustration the spring 43 is shown supporting electric contacts 44 cooperating with stationary contacts. Here the leaf spring is anchored to part of a frame 45. Such a spring may be treated as described above as to be substantially limp or to have any other desired force-displacement characteristic. Such a spring gives the characteristics desired in a direction of intended motion with the necessary restraints in other directions.

Referring to Fig. 9, a built-up automobile leaf spring assembly is illustrated diagrammatically in which the several leaves are indicated by 50. One or more of the leaves 50 may be treated in a manner discussed above with respect to Figs. 1 and 2 to obtain minimum bending rigidity throughout a limited range with increased bending rigidity near the limits of motion in both directions as indicated in Fig. 3. Such an automobile spring will exhibit riding qualities of extreme softness through the normal operating range and yet provide the stiffness required for dealing with large amplitudes of motion.

Thus the treatment above described acts to preload certain vital parts of the material. This preloading produces an action in the nature of over-centering action which combines with the normal spring action of the material to weaken its resistance to bending. This treatment may be used to put other parts of the material under tension so that, with given torsional forces applied within the strength of the material, less displacement is obtained.

As above stated, the decreased bending rigidity has advantages in places like automobile springs and in constructions or devices such as valves, armatures, movable electrical contacts, etc. The increased torsional rigidity should be of advantage in uses such as in structural shapes used for automobile frames which now often require X-members to obtain necessary torsional rigidity. By pre-stressing the several longitudinal and cross members making up the automobile frame, according to the invention, either lighter material may be used or the X-members may be omitted. Increased torsional rigidity is also of advantage in rotary shafts for machines to reduce torsional deflection.

The examples of pre-stressing given above may be applied to iron and steel and alloys thereof, and also to non-ferrous and other materials susceptible to such treatment. The peening may penetrate to various depths from mere surface peening where only the skin of the metal is compressed to deeper peening when the entire thickness of the metal sheet is compressed.

In the cases above described of pre-stressing by peening or rolling, the metal may first be heated to remove internal strains, if any, prior to such peening or rolling, and in each case the peening or rolling is done cold, thus cold working the metal.

While certain novel features of the invention have been disclosed herein, and are pointed out in the annexed claim, it will be understood that various omissions, substitutions and changes may be made by those skilled in the art without departing from the spirit of the invention.

What is claimed is:

The method of increasing the torsional rigidity of a metal beam, said beam having angularly related webs extending lengthwise of the beam and imparting to said beam substantial resistance to bending, said beam having at least one first longitudinal area which is subject to compressive stress when the beam is loaded in torsion in use, said beam having second longitudinal areas which are subject to tensile stress when the beam is loaded in torsion in use, said first longitudinal area being intermediate said second longitudinal areas, said method comprising stretching the metal in said first longitudinal area beyond its elastic limit, lengthwise of the beam, to place said first longitudinal area under residual compression, thereby to place said second longitudinal areas under residual tension.

LINCOLN K. DAVIS.

References Cited in the file of this patent

UNITED STATES PATENTS

| Number | Name | Date |
|---|---|---|
| 73,983 | Lane | Feb. 4, 1868 |
| 291,814 | Timmis | Jan. 8, 1884 |
| 450,836 | Evans | Apr. 21, 1891 |
| 1,638,516 | Ware | Aug. 9, 1927 |
| 1,725,439 | Carns | Aug. 20, 1929 |
| 1,784,866 | Farenwald | Dec. 16, 1930 |
| 1,963,056 | Wilcox | June 12, 1934 |
| 1,987,166 | Valverde | Jan. 8, 1935 |
| 2,056,816 | Zimmerli | Oct. 6, 1936 |
| 2,141,220 | Olsen | Dec. 27, 1938 |
| 2,204,793 | Davis | June 18, 1940 |
| 2,234,850 | Wallace | Mar. 11, 1941 |
| 2,292,363 | Crawford | Aug. 11, 1942 |
| 2,314,976 | Walter | Dec. 15, 1942 |

FOREIGN PATENTS

| Number | Country | Date |
|---|---|---|
| 315,216 | Great Britain | Sept. 4, 1930 |
| 564,311 | Great Britain | Sept. 21, 1944 |